March 23, 1954  B. H. CHATLYNNE ET AL  2,672,943
SAFETY LOCK FOR AUTOMOBILE DOORS
Filed Jan. 6, 1951
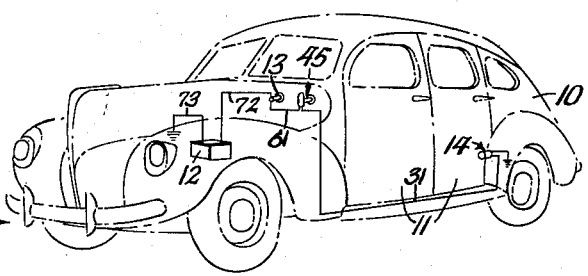
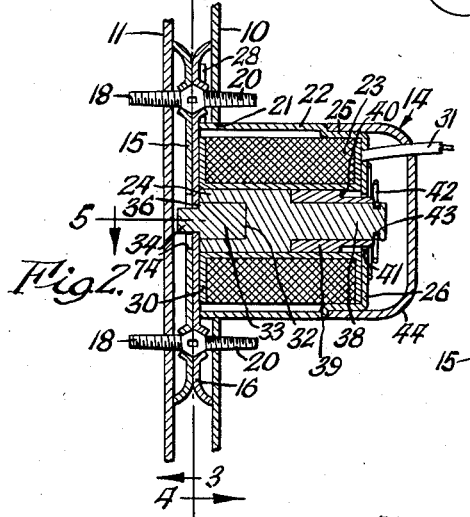
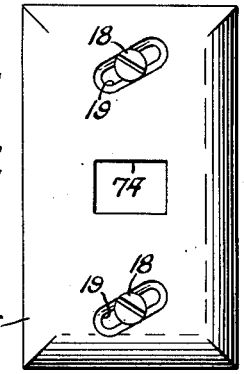
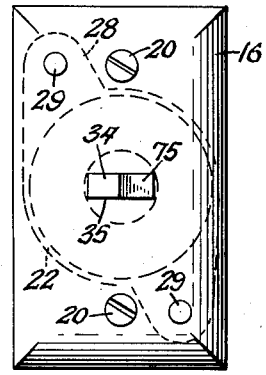
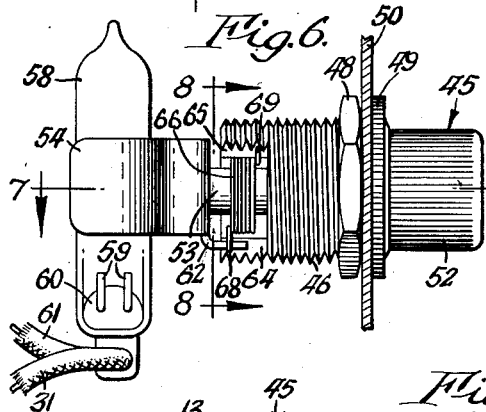
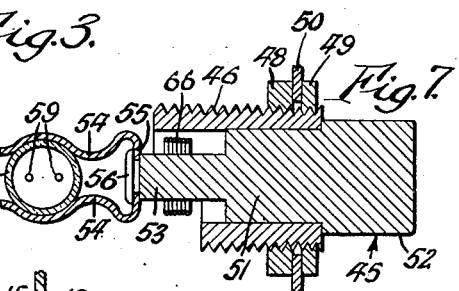
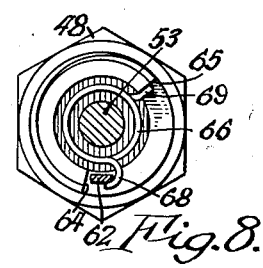
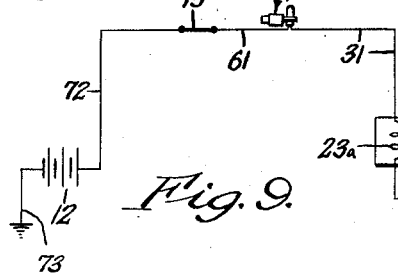
INVENTOR.
Bert H. Chatlynne
Marvin C. Herget
by Popp and Sommer
Attorneys.

Patented Mar. 23, 1954

2,672,943

UNITED STATES PATENT OFFICE 2,672,943

SAFETY LOCK FOR AUTOMOBILE DOORS

Bert H. Chatlynne, Buffalo, and Marvin C. Herget, Depew, N. Y., assignors to Sell Well Industries Inc., Buffalo, N. Y., a corporation of New York Application January 6, 1951, Serial No. 204,728

4 Claims. (Cl. 180—82)

1

This invention relates to improvements in vehicle door locks and more particularly to safety locks for the doors of automobiles.

The principal object of the invention is to automatically maintain the doors of an automobile locked in closed position when the ignition key is turned on and thereby prevent the doors from being inadvertently opened when the automobile is in condition for self-propulsion.

Another object is to provide such a safety door lock which can be unlocked by a specific manual act even though the ignition key is turned on, so as to permit a desired opening of the door even though the automobile is in condition for self-propulsion.

Another object is to provide such a safety door lock which will be automatically unlocked when the automobile assumes an angle greater than in normal driving conditions so that in case of accident in which the automobile may be tipped on its side or to a dangerous angle the doors may be readily opened.

A further object is to provide such a safety door lock which is simple in construction, inexpensive to manufacture, easy to install and not likely to get out of order or require repairs.

Other objects and advantages of the invention will be apparent from the following description and accompanying drawing wherein Fig. 1 is a perspective view of an automobile on which a safety door lock system embodying the present invention has been installed, the elements of said system being diagrammatically represented in the figure by solid lines.

Fig. 2 is a vertical central sectional view through the safety door lock shown in Fig. 1.

Fig. 3 is an elevational view of the outer face of the catch plate as mounted on the automobile door, this view being taken on line 3—3, Fig. 2.

Fig. 4 is an elevational view of the outer face of the face plate as mounted on the automobile body, this view being taken on line 4—4, Fig. 2.

Fig. 5 is a fragmentary horizontal sectional view of the safety door lock and taken on line 5—5, Fig. 2.

Fig. 6 is a side elevational view on an enlarged scale for illustrative purposes, of a manually tiltable level switch forming a part of the safety door lock system illustrated in Fig. 1.

Fig. 7 is a horizontal longitudinal sectional view thereof and taken on line 7—7, Fig. 6.

Fig. 8 is a vertical transverse sectional view thereof and taken on line 8—8, Fig. 6.

Fig. 9 is a wiring diagram for the apparatus of the safety door lock system shown in Fig. 1.

The numeral 10 represents the body of an automobile having a plurality of doors 11. The automobile's ignition system includes the usual storage battery 12 and ignition switch 13, the latter usually being turned on and off by a key (not shown).

2

In accordance with the present invention a safety door lock represented generally at 14 is associated with the rear door of the automobile shown in Fig. 1. Any number of doors of the automobile may be provided with such safety door lock assemblies 14.

As shown in Fig. 2, a slight space exists between the rim of the door 11 and the opposing part of the body 10. In this space at any suitable vertical location along the door, a catch plate 15 is fastened to the door 11 and a face plate 16 carrying a solenoid is fastened to the body 10. Both of these plates 15 and 16 have a laterally turned edge which engages the respective support so as to offset therefrom the flat portions of these plates. The catch plate 15 is fastened to the door 11 by a pair of screws 18 arranged in upwardly inclined and parallel slots 19 as shown in Fig. 3 so as to permit vertical and lateral adjustment of this plate. The face plate 16 is shown as fastened to the body by a pair of screws 20.

The solenoid carried by the face plate 16 is arranged in a recess 21 provided in the body 10 and includes a housing 22 for a coil 23 and an armature 24. The housing 22 is shown as having a cylindrical body portion formed to provide an inwardly offset inner end section 25 connecting with an inner end wall 26. The housing 22 is preferably mounted on the face plate 16 by a pair of diametrically opposite ears 28 extending laterally outwardly from the outer end of the housing and rigidly connected to the face plate by rivets 29, as shown in Fig. 4.

The coil 23 is wound upon a cylindrical spool 30 the end walls of which engage the face plate 16 and end wall 26 of the housing 22 and the rear or inner portion of the coil is shown as closely embraced by the inwardly offset end section 25 of the housing. One end of the coil 23 is suitably grounded to the housing 22 and the other end extends outwardly as the insulated wire 31 through a hole in the end wall 26.

The armature 24 is shown as a cylindrical plunger slidably arranged in the bore of the coil 23 and having a cylindrical recess 32 at its front or outer end into which a bolt piece 33 is press fitted so as to move with the armature. The exposed nose 34 of the bolt piece 33 has flat upper and lower surfaces and has a vertical thickness less than the diameter of the cylindrical part of the bolt piece arranged in the recess 32 as shown in Fig. 2 and a horizontal width transversely of the axis of the armature of not more than said diameter, as shown in Fig. 5. The nose 34 is adapted to protrude through a rectangular opening 35 in the face plate 16 and the portions of the bolt piece 33 above and below this nose provide shoulders 36 engageable with the inner surface of the face plate to limit the protrusion of the armature only to the extent of the axial width of the nose 34 as shown in Fig. 2.

The inner end of the armature 24 is formed with an axially extending neck 38 of reduced diameter and on this neck a cylindrical guide sleeve 39 is press fitted. The inner part of this guide sleeve 39 is shown as having a diameter equal to that of the armature 24 but the outer part of this guide sleeve is of slightly reduced diameter so as to form a rearwardly facing shoulder 40. The sleeve 39 is slidably arranged in a hole 41 in the end wall 26 of the housing 22 and the shoulder 40 is adapted to engage the inner surface of this end wall adjacent the hole 41.

In this manner the armature 24 is arranged for free and easy fore and aft axial movement in the bore of the coil 23.

The armature 24 is normally held in a retracted position so that the nose 34 of the bolt piece 33 does not extend outwardly beyond the outer face of the face plate 16. For this purpose a spiral coil spring 42 is arranged with its larger end bearing against the outer surface of the end wall 26 of the housing 22 and its other smaller end arranged in an annular groove 43 provided in the rear extremity of the neck 38 which projects rearwardly of the guide sleeve 39.

A cap 44 is shown as covering the rear or inner end of the solenoid and the rim of this cap preferably press fits the end section 35 of the solenoid housing 22. The insulated wire 31 extends through a hole in the cap 44. This cap 44 serves as a dust cover for the solenoid.

The manually tiltable level switch 45 shown diagrammatically in Fig. 1 is shown in detail in Figs. 6–8. This switch comprises an externally threaded sleeve 46 on which a pair of nuts 48 and 49 are arranged whereby the sleeve 46 can be mounted in a hole in the instrument panel 50 of the automobile with the nuts 48 and 49 tightened down against opposite sides of this panel as shown in Figs. 6 and 7. Of course, the switch 45 may be mounted in any desired location on the instrument panel, or any other convenient place. Journaled within the sleeve 46 is a shaft 51 having an enlarged knob 52 at its outer end and being formed at its inner end with an axially extending neck 53 of reduced diameter.

A U-shaped clamp comprising a pair of horizontally spaced spring jaws or arms 54, 54 connected by a cross part 55 is mounted on the free end of the neck 53. The cross part 55 is rigidly fastened to the end face of this neck 53 by a rivet 56. A mercury switch 58 is held between the jaws or arms 54 of the clamp. This mercury switch 58 is of conventional construction and includes a glass vial housing a pair of wire terminals 59, 59 and containing a body of mercury 60. The wire 31 from the coil 23 connects with one of the terminals 59 and the other terminal 59 is connected by the line 61 with the dead side of the ignition switch 13 when the same is turned off.

The shaft 51 is capable of being turned relative to the stationary sleeve 46 through an angle sufficient to move the mercury switch 58 from the upright position shown in Fig. 6 to a position in which the body of mercury 60 is disposed at the end of the vial opposite from the terminals 59 and out of contact therewith thereby breaking the electrical connection between the lines 31 and 61.

As shown, the shaft 51 can rotate through an angle slightly less than 180 degrees. For this purpose the cross part 55 of the mercury switch clamp has a laterally turned finger 62 which is arranged in a cut out 63 provided in the inner end of the sleeve 46 as shown in Fig. 6. The finger 62 extends generally axially of the shaft 51 and to one side of the reduced neck 53 of this shaft. The circumferentially spaced radial end faces 64 and 65 of the sleeve 46 formed by the cut out 63 are arranged at an included angle slightly less than 180 degrees and these end faces serve as stops for the finger 62 as shown in Fig. 8.

The finger 62 is constantly urged toward the end face 64 by a helical wind up spring 66 surrounding the neck portion 53 of the shaft 51 and has its opposite ends 68 and 69 turned outwardly to engage the finger 62 and end face 65 respectively as shown in Figs. 6 and 8.

The sleeve 46 is adjusted on the instrument panel 50 so that with the finger 62 held against the stop face 64 by the spring 66, the mercury switch 58 is held in an upright position in which the terminals 59 are connected with the mercury body 60. When it is desired to break the circuit, the knob 52 may be grasped and the shaft 51 turned in a counterclockwise direction as viewed in Fig. 8 so that the finger 62 is swung out of engagement with the stop face 64 and toward the stop face 65 which operates to further wind up the spring 66 and to tilt the mercury switch 58 so as to break the electrical connection between the lines 31 and 61. When the knob 52 is released the spring 66 returns the finger 62 to engagement with the stop face 64 which operates to upright the mercury switch 58 again into a closed operative condition.

It will be noted also that should the automobile turn over as in an accident the mercury switch 58 will be turned upside down even though no relative movement takes place between the shaft 51 and sleeve 46. This will operate also to break the circuit and deenergize the safety door lock solenoid and open this lock.

Fig. 9 shows a wiring diagram for an installation including two safety door locks 14a and 14b, say for both rear doors of a four door automobile. The coils 23a and 23b of these respective locks are connected in series by the wire 70 and the end lock coil 23b is grounded as indicated at 71. The positive side of the battery 12 is connected to the ignition switch 13 by the wire 72 and the negative side of the battery is grounded as indicated at 73. The ground connections are to the frame as is usual. It will be understood, of course, that a two wire system may be used, if desired, instead of the single wire system shown.

Referring to Fig. 9, it will be seen that if the ignition switch 13 is closed as by turning on the usual ignition key (not shown) and with the automobile upright and the mercury switch 58 of the manually tiltable level switch 45 closed, the coils 23a and 23b will be energized and the respective armature of each will extend its respective nose piece 34 into an enlarged opening 74 in the corresponding catch plate 15 and thereby lock the door against accidental opening. However if it is desired to release the safety door locks while the ignition switch 13 is closed or turned on, the knob 52 can be turned as previously explained to break the circuit and deenergize the door lock solenoids. Also, if the automobile overturns or tilts beyond a predetermined angle, the mercury switch 58, which serves as a level switch will break the circuit and thereby release the safety door locks.

In case the door 11 should be closed after the safety lock for that door is actuated so that its bolt nose 34 is protruding from the corresponding face plate 16, the door may still be closed since a bevel 75 is provided on the lateral outer corner of the bolt nose. This permits the door as it is swung closed to engage with the beveled surface 75 and cam the bolt nose 34 back into the body 10 until the opening 74 in the catch plate comes opposite this nose piece whereupon the plunger assembly again extends itself into operative position as shown in Fig. 5.

While the solenoid of the safety door lock has been illustrated as mounted on the body and the catch plate on the door of the automobile these parts can be reversed, if desired. Also, the safety door lock can be located at any suitable place along the top or bottom rim of the door, if desired, instead of along the vertical side thereof as shown.

We claim:

1. In an automobile having a door, a battery and an ignition switch connected with said battery, the combination therewith of a safety door lock comprising a solenoid the armature of which serves as the bolt for said lock, a normally closed level switch connecting said ignition switch with said solenoid, means mounting said level switch on said automobile and arranged to permit of manually tilting said level switch to open the same, and resilient means arranged to resist the turning of said level switch and upon release thereof operating to return said level switch to its initial position, whereby said solenoid is energized when said ignition switch is closed but is adapted to be deenergized when said level switch is manually tilted or the automobile is tilted beyond a predetermined angle.

2. In an automobile having a door member, a body member, a battery and an ignition switch connected with said battery, the combination therewith of a safety door lock, comprising a solenoid mounted on one of said members, the armature of said solenoid when deenergized being retracted but when energized said armature is projected into a recess provided in the other of said members, and a manually tiltable normally closed level switch comprising a shaft rotatably mounted on said automobile, a mercury switch carried by said shaft and normally arranged in a closed operative position and connected in series with said ignition switch and solenoid, said shaft being manually turnable to tilt said mercury switch to an open inoperative position and a spring operatively arranged between said shaft and automobile to oppose the tilting of said mercury switch to said inoperative position and said spring also serving to return said mercury switch from said inoperative to said operative position, whereby closing of said ignition switch closes the circuit through said solenoid and energizes the same and moves said armature into operative door locking position but said solenoid being adapted to be deenergized and thereby return said armature to an inoperative position when said mercury switch is manually tilted or the automobile is tilted beyond a predetermined angle.

3. In an automobile having a door member, a body member, a battery and an ignition switch connected with said battery, the combination therewith of a safety door lock, comprising a solenoid mounted on one of said members, the armature of said solenoid when deenergized being retracted but when energized said armature is projected into a recess provided in the other of said members, a manually tiltable normally closed level switch comprising a tubular sleeve mounted on said automobile, a shaft journaled in said sleeve, a knob on one end of said shaft, a clamp member mounted on the other end of said shaft and movable therewith, a mercury switch arranged on said clamp member and held thereby in a normally closed operative position and connected in series with said ignition switch and solenoid, said shaft being manually turnable to tilt said mercury switch to an open inoperative position and a wind up spring surrounding said shaft and having one end operatively connected thereto and its other end connected to said sleeve, said spring opposing turning of said shaft relative to said sleeve, whereby closing of said ignition switch closes the circuit through said solenoid and energizes the same and moves said armature into operative door locking position but said solenoid being adapted to be deenergized and thereby return said armature to an inoperative position when said mercury switch is manually tilted or the automobile is tilted beyond a predetermined angle.

4. In an automobile having a door member, a body member, a battery and an ignition switch connected with said battery, the combination therewith of a safety door lock, comprising a solenoid mounted on one of said members, the armature of said solenoid when deenergized being retracted but when energized said armature is projected into a recess provided in the other of said members, a manually tiltable normally closed level switch comprising a tubular sleeve mounted on said automobile, a shaft journaled in said sleeve, a knob on one end of said shaft, a U-shaped clamp member having spaced arms connected by a cross part, means fastening said cross part to the other end of said shaft and movable therewith, a mercury switch arranged between said clamp arms and held thereby in a normally closed operative position and connected in series with said ignition switch and solenoid, said sleeve being provided with a cut out portion at the end thereof adjacent said clamp to provide a pair of circumferentially spaced radial stop faces, a finger on said cross part and movably arranged between said stop faces and adapted to engage the same, and a wind up spring surrounding said shaft and having one end thereof turned radially outward to engage one of said stop faces and having its other end also turned radially outward to engage said finger, said shaft being manually turnable to tilt said mercury switch to an open inoperative position against the urging of said spring, whereby closing of said iginition switch closes the circuit through said solenoid and energizes the same and moves said armature into operative door locking position but said solenoid being adapted to be deenergized and thereby return said armature to an inoperative position when said mercury switch is manually tilted or the automobile is tilted beyond a predetermined angle.

BERT H. CHATLYNNE.
MARVIN C. HERGET.

References Cited in the file of this patent

UNITED STATES PATENTS

| Number | Name | Date |
| --- | --- | --- |
| 1,627,728 | Conklin | May 10, 1927 |
| 1,883,241 | Phelan | Oct. 18, 1932 |
| 1,995,889 | Landry | Mar. 26, 1935 |
| 2,189,748 | Wilson | Feb. 6, 1940 |
| 2,192,262 | Griesedieck | Mar. 5, 1940 |
| 2,211,221 | Wilkerson | Aug. 13, 1940 |
| 2,530,628 | Pivero | Nov. 21, 1950 |